(12) United States Patent
Cole et al.

(10) Patent No.: US 9,407,902 B1
(45) Date of Patent: Aug. 2, 2016

(54) 3D VIDEO ENCODING AND DECODING METHODS AND APPARATUS

(75) Inventors: David Michael Cole, Pembroke Pines, FL (US); Alan McKay Moss, Signal Mountain, TN (US)

(73) Assignee: NEXTVR INC., Laguna Beach, CA (US)

( * ) Notice: Subject to any disclaimer, the term of this patent is extended or adjusted under 35 U.S.C. 154(b) by 595 days.

(21) Appl. No.: 13/443,864

(22) Filed: Apr. 10, 2012

Related U.S. Application Data (60) Provisional application No. 61/473,809, filed on Apr. 10, 2011.

(51) Int. Cl.
*H04N 13/02* (2006.01)
*H04N 13/04* (2006.01)

(52) U.S. Cl.
CPC ............ *H04N 13/02* (2013.01); *H04N 13/04* (2013.01)

(58) Field of Classification Search
CPC ............ H04N 13/00; H04N 13/0007; H04N 13/0051; H04N 13/0055; H04N 13/02; H04N 13/04
USPC ........................................ 348/42, 43
See application file for complete search history.

(56) References Cited

U.S. PATENT DOCUMENTS

| | | | |
|---|---|---|---|
| 6,674,463 B1* | 1/2004 | Just et al. | 348/43 |
| 7,003,136 B1* | 2/2006 | Harville | 382/103 |
| 2002/0089585 A1 | 7/2002 | Masters et al. | |
| 2003/0152264 A1* | 8/2003 | Perkins | 382/154 |
| 2004/0064299 A1* | 4/2004 | Mark et al. | 703/13 |
| 2006/0268104 A1 | 11/2006 | Cowan et al. | |
| 2007/0052794 A1* | 3/2007 | Ha et al. | 348/42 |
| 2007/0147502 A1* | 6/2007 | Nakamura | 375/240.12 |
| 2008/0204547 A1 | 8/2008 | Bodinet | |
| 2009/0220213 A1 | 9/2009 | Ogawa et al. | |
| 2009/0238447 A1 | 9/2009 | Uchiyama et al. | |
| 2010/0053310 A1* | 3/2010 | Maxson et al. | 348/51 |
| 2011/0074933 A1 | 3/2011 | Held et al. | |
| 2011/0134217 A1 | 6/2011 | Neuman et al. | |
| 2013/0010062 A1 | 1/2013 | Redmann et al. | |
| 2013/0021438 A1 | 1/2013 | Tucker | |

* cited by examiner

*Primary Examiner* — Mohammed Rahaman
*Assistant Examiner* — Jimmy S Lee
(74) *Attorney, Agent, or Firm* — Michael P. Straub; Abbas Zaidi; Straub & Pokotylo (57) ABSTRACT

Methods and apparatus relating to encoding and decoding stereoscopic (3D) image data, e.g., left and right eye images, are described. Various pre-encoding and post-decoding operations are described in conjunction with difference based encoding and decoding techniques. In some embodiments left and right eye image data is subject to scaling, transform operation(s) and cropping prior to encoding. In addition, in some embodiments decoded left and right eye image data is subject to scaling, transform operations(s) and cropping prior to being output to a display device. Transform information, scaling information and/or cropping information may be included in a bitstream communicating encoded left and right eye images. The amount of scaling can be the same for an entire scene and/or program.

18 Claims, 8 Drawing Sheets

3D VIDEO ENCODING AND DECODING METHODS AND APPARATUS

RELATED APPLICATIONS

The present application claims the benefit of the filing date of U.S. Provisional Patent Application Ser. No. 61/473,809 filed Apr. 10, 2011 titled "3D VIDEO ENCODING AND DECODING METHODS AND APPARATUS", which is hereby expressly incorporated by reference in its entirety.

FIELD

The present application is related to stereoscopic video encoding and decoding and, more particularly, to methods and/or apparatus for supporting encoding and decoding of stereoscopic video using left and right eye image encoding and decoding techniques, e.g., difference based encoding and decoding techniques.

BACKGROUND

Left and right eye images of a frame pair in stereoscopic video often include minor differences resulting from the different spatial locations of the cameras used to capture the left and right eye images of a frame pair.

Difference encoders, e.g., motion based or other interframe encoders, offer an attractive method of encoding left and right eye images. Unfortunately, while the left and right eye images are often very similar, the relatively minor differences between the images can result a fair amount of encoding artifacts and/or less then desirable data compression when difference based encoding methods are used to encode a sequence of frames including left and right eye images of a stereoscopic image sequence, e.g., movie, program or other piece of video or 3D image content.

In view of the above discussion, it should be appreciated that there is a need for improved methods of generating encoded stereoscopic image data and for decoding such data. While it is desirable that difference encoding and decoding techniques be used, it would be desirable if pre and/or post encoding or decoding techniques could be developed to improve the quality and/or data efficiency achieved by the overall encoding and/or decoding process.

SUMMARY

Methods and apparatus for stereoscopic video encoding and decoding are described. In various embodiments, images, e.g., frames corresponding to left and right eye images are encoded after the left and right eye images are arranged so that they are interleaved as they are supplied to an encoder. The encoder efficiently encodes the left and right eye images using difference encoding techniques, e.g., motion vectors with one eye image being used as reference data for the other.

While the interleaving of left and right eye images results in rather efficient encoding due to the fact that left and right eye images are often very similar in content but often shifted slightly, various features of the present invention allow for more efficient encoding than that which can be achieved by simply interleaving left and right eye images. In many cases the methods and apparatus involve various pre-encoding and/or post decoding processing steps.

At least some embodiments relating to improving the efficiency of encoding performed by an encoder which processes left and right eye images, e.g., in an interleaved manner, and which performs at least some difference based encoding, e.g., motion compensated prediction or other encoding where the coding of one frame may depend on the image data of a preceding frame.

In at least one embodiment processing of stereoscopic image data including a left eye image and a right eye image of a frame pair, includes scaling said left eye image and said right eye image by a first amount, performing a left eye transform operation on said scaled left eye image to generate a transformed left eye image, performing a right eye transform operation on said right eye image to generate a transformed right eye image, and cropping said transformed left eye image and said transformed right eye image to generate a cropped transformed left eye image and a cropped transformed right eye image. The method may further include encoding the cropped transformed left and right eye images using an encoder which performs difference encoding on at least one of said cropped transformed left and right eye images using the other one of said transformed cropped left and right eye images as a reference image, said encoding producing an encoded left eye image and an encoded right eye image. In some but not necessarily all embodiments the difference encoding includes motion compensated prediction encoding. While the amount of scaling may be set for a scene or program including multiple frames, the process performed on the images of an individual frame pair often includes determining a first transform to be used as said left eye transform operation and a second transform to be used as said right eye transform operation for the left and right eye images of a frame pair. The determination of the left and right eye image transforms to be used may, and in some embodiments does, include comparing content of said left eye image and said right eye image to determine image transform operations which will reduce the difference between an area of said scaled transformed left eye image and said scaled transformed right eye image. Transforms which may be determined include image a null transform, a shifting transform, an anamorphic scaling transform, a keystone transform and/or or a warping transform. When the null transform is applied no change is made to the processed images. In the case of the other transforms which result in image changes, the transform applied to the left and right images are normally equal and opposite to each other to reduce the amount of overall change, e.g., shift, to either image while still making a transform intended to reduce the difference between the cropped transformed left and right eye images which are supplied to the encoder for encoding.

Information about the transform applied to the left and right eye images along with the amount of scaling and/or cropping information applied to generate the encoded left and right eye images is stored and/or communicated to a playback device with the generated left and right eye images.

A decoder decodes then scales and crops received encoded left and right images based on the scaling and/or cropping information communicated and/or encoded with encoded left and right eye images. If transforms were applied prior to encoding, following decoding the decoded left and right eye images are subjected to inverse transforms prior to the cropping operation. The inverse transforms may be based on information included in the bitstream with the encoded images. The information may specify the inverse transform operation to be performed, e.g., by indicating what the original transform was or by indicating a particular operation to be used as the inverse transform. As a result of the cropping operation the final image output will be, at least in some embodiments, the same size as the encoded left and right images.

In some embodiments data lost in one of the left and right images as a result of the shifting and cropping maybe, and in some embodiments is, replaced with data from the other one of the left and right eye images corresponding to the same image location as the location where the image data was lost. While the scaling, transform, e.g., shifting, and cropping operations performed prior to encoding and subsequent to decoding may result in the loss of some image data, the decrease in differences between left and right eye images supplied to the decoder can result in more efficient and/or accurate coding of the images portions which remain. Thus the overall effect of the pre-coding and post-coding processing when combined with use of a difference encoder can result, in many cases, in improved perceived image quality for a given data rate or total amount of data than could be achieved without the use of the pre-coding and post-coding processing used in various embodiments.

Various additional features and embodiments are described in the detailed description which follows.

DETAILED DESCRIPTION

Figure 1:
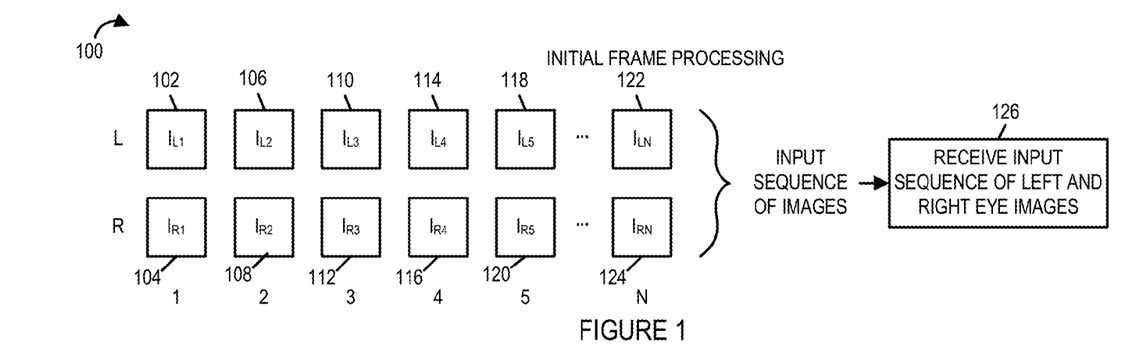
FIG. 1 is a drawing of an exemplary received sequence of left and right eye image pairs for a sequence of frames in accordance with an exemplary embodiment.

In accordance with one embodiment of the present invention a sequence of frames, e.g., left and right eye image frame pairs, is received. Drawing 100 of FIG. 1 illustrates exemplary reception of an input sequence of left and right eye image frame pairs. Corresponding to frames (1, 2, 3, 4, 5, ..., N), input image pairs (($I_{L1}$ 102, $I_{R1}$ 104), ($I_{L2}$ 106, $I_{R2}$ 108), ($I_{L3}$ 110, $I_{R3}$ 112), ($I_{L4}$ 114, $I_{R4}$ 116), ($I_{L5}$ 118, $I_{R5}$ 120), ..., ($I_{LN}$ 122, $I_{RN}$ 124)), respectively, are received as indicated by box 126.

Figure 2:
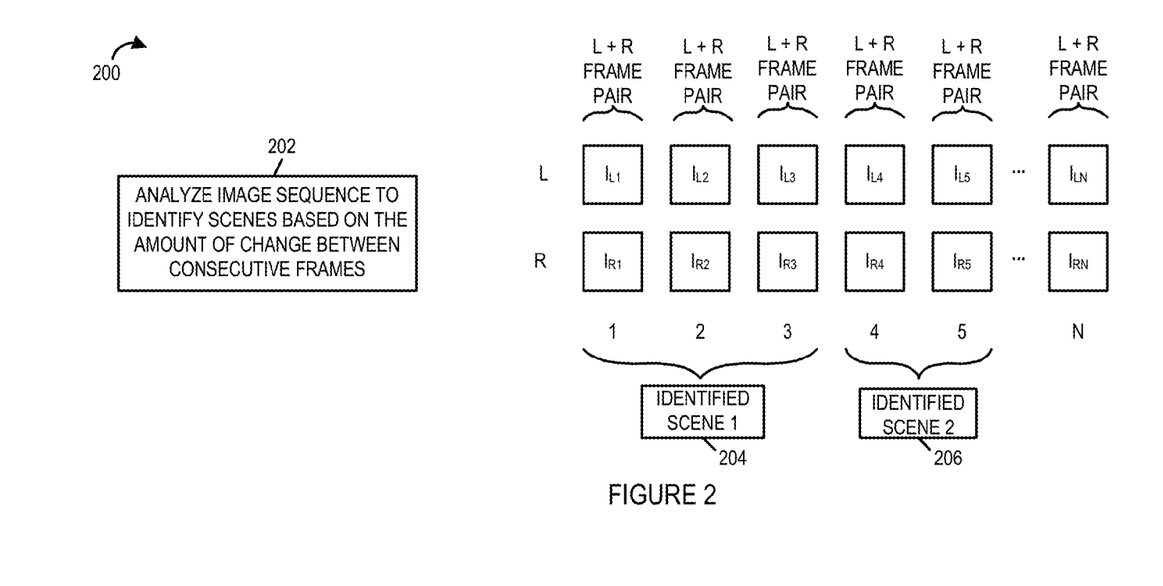
FIG. 2 illustrates exemplary identified scenes in a sequence of left and right frame image pairs, e.g., exemplary groupings of frames into scenes, in accordance with an exemplary embodiment.

Drawing 200 of FIG. 2 illustrates that the input frames are analyzed to group the frames into sets where each set corresponds to a scene. In this example, the input image is analyzed to identify scenes based on the amount of change between consecutive frames, as indicated by box 202. In this example, there is an identified scene 1 204 corresponding to the L+R frame pairs for frames 1, 2 and 3, and there is an identified scene 2 206 corresponding to the L+R frame pairs for frames 4 and 5. In some embodiments, an input group corresponding to multiple L+R frame pairs is initially analyzed to identify scenes, and then at a later point in time the frame pairs of each of the identified scenes are subsequently processed, e.g., on a per scene basis. In some other embodiments, determination of scene boundary points is determined on an ongoing basis along with the processing. For example, after reception of a L+R input image pair, the received image pair is classified as the first image pair of a new scene or an image pair of an ongoing scene, and then the image pair is processed, e.g., transformed.

Scenes may, and in some embodiments are, distinguished based on the amount of difference from one image to the next. In accordance with one embodiment, scene analysis and grouping of frames to scenes is based on a single one of the left and right eye image sequences. For example, the left eye images may be analyzed and a significant change, e.g., a difference in luminance values above a predetermined threshold from one scene to the next, may be used to distinguish between frames corresponding to different scenes. Techniques used to divide frames into groups of pictures for image encoding may be used to separate the input frames into different scenes. Once a scene break point is determined, the left and right eye frames determined to correspond to a scene are treated as a group of frames for subsequent image processing and encoding purposes.

While differences between the frames corresponding to a single eye can be used to determine scene break points, in accordance with one embodiment of the present invention differences between left and right eye frames of individual frame pairs is also considered. A large difference between a left eye image and right eye image of a frame pair may be used to determine a scene break point for encoding purposes. In some embodiments this scene determination consideration is combined with the difference between consecutive images (frames) when deciding how to group frame pairs to scenes for purpose of frame groupings that are then subject to further processing.

Figure 3:
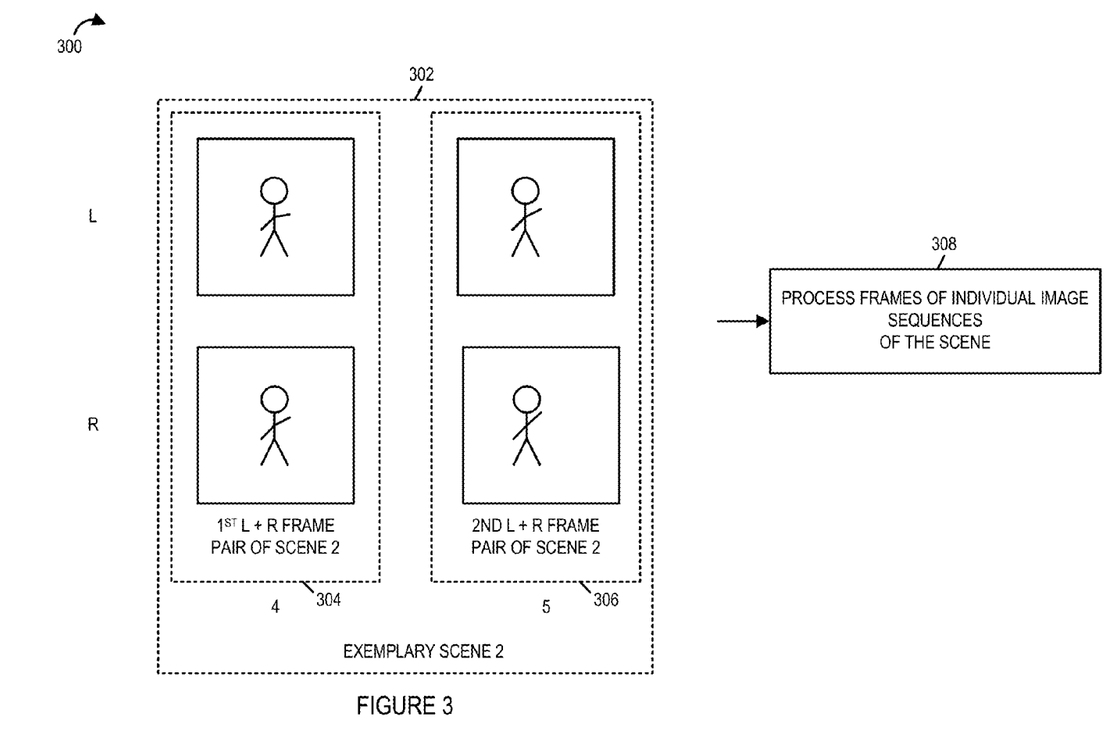
FIG. 3 illustrates exemplary images in an exemplary scene, in which image pairs of the frame are processed, e.g., transformed in accordance with a selected transform method for the scene, in accordance with an exemplary embodiment.

Drawing 300 of FIG. 3 illustrates exemplary scene 2 302, which comprises $1^{st}$ L+R image pair 304 for frame 4 and $2^{nd}$ L+R image pair 306 for frame 5. Notice that there are slight differences between the left and right image corresponding to a particular frame, and that there are also slight difference between the images of frame 4 and 5 corresponding to same side. The frame pairs of individual image sequences of the scene are processed, as indicated by block 308. In some embodiments, processing the first frame of a scene is performed differently than processing subsequent frames of the scene. For example, in one exemplary embodiment, if the image pair is the first frame of a scene, then an operation is performed to determine which transform method should be used for the scene, and then the determined transform method is applied to the image data of the frame. Continuing with the example, if the image pair is a subsequent frame of a scene, then a transform parameter adjustment is performed to the determined transform method and then the image data of the frame is processed.

In some embodiments, the frame pairs of each scene are processed in accordance with one feature of the invention to minimize differences between frames corresponding to a frame pair and to make sure that scaling differences from one frame pair to the next in a scene are not too large, e.g., above a threshold, which might result in noticeable size differences of an object from one frame to the next. Scene level processing of one exemplary embodiment is described below.

Scene level processing involves analyzing each left and right frame pair to determine the maximum image shift required in each of the vertical & horizontal directions to minimize the difference in the left and right frames if the shifted images are compared. The shifting process assumes that each of the left and right eye images can be shifted by half of the maximum permitted shift. In some embodiments the amount of image shift which is permitted is up to 5%.

After the optimal image shift to reduce the difference between the images when they are overlaid for each of the image pairs of the scene is determined, subject to the constraint of a maximum permitted shift the largest of the shifts is determined. Next a maximum scaling amount is determined for the scene. The maximum scaling amount is the amount of scaling required to fully occupy a frame of the original display size if an image shifted by the maximum determined scene shift was scaled to the original display size and fully occupied the display window.

The left and right eye frames of each frame in the sequence are then scaled by an amount less than or equal to the maximum scaling amount. The amount applied to a particular pair of frames is determined by the amount of shift required to minimize the difference between the frames taking into consideration that the amount of scaling should not differ from that applied to a preceding frame pair of the same scene by a visibly noticeable amount, e.g., by more than a few percent, in some cases no more than 2 or 3 percent.

After scaling of the first pair of images in an image sequence to minimize the difference between the overlapping portions of the shifted frames, the scaled images are cropped to the original intended display size. The scaled and cropped frame pair is then provided to an encoder which efficiently encodes the scaled and cropped images, e.g., as if no image shifting or scaling had occurred. Metadata indicating the amount of horizontal and vertical shifting applied to the left and right eye images along with scaling information is encoded as metadata or auxiliary data and communicated in the encoded data along with the image data representing the left and right eye image pair.

The shifting, scaling, cropping steps are repeated for each left and right frame pair corresponding to a scene with change in scaling from one image to the next being constrained to limit the amount of change in the size of an object from one frame pair to the next. The encoder may, and in some embodiments does, treat the frames of a scene as a GOP (Group of Pictures) for encoding purposes with the left and right frames of an image sequence being supplied to the encoder in an alternating manner. As a result of the shifting, scaling and cropping operations, images are encoded in an efficient manner with very little or no difference between many of the left and right eye images allowing for the encoder to simply indicate that the second frame in a left and right eye image pair is the same as the previous frame in many cases.

A decoder implemented in accordance with the invention receives stereoscopic image data, e.g., a sequence of encoded frame pairs along with the encoded data indicating the shifting and/or scaling that was applied prior to encoding, e.g., using motion compensated prediction and/or entropy encoding techniques. The decoder decodes the encoded image corresponding to a frame pair and then scales the decoded image data of the frame pair by the amount of scaling indicated by the information associated with the frame pair being decoded. The decoder then reverses the indicated image shift moving the scaled images back into their correct positions for purposes of final display. The decoded scaled and shifted images are then cropped leaving rectangular images of the intended display size for display.

The decoded, scaled, shifted and cropped left and right eye images are then sent to a rendering unit for display.

Given that scaling and cropping occurs in both the encoder and decoder, the maximum amount of image loss due to scaling and cropping is normally twice the amount applied in either the encoder or decoder alone.

While the scaling and cropping of the present invention can result in some loss of edge portions of an image, the savings in terms of encoded data rate made possible by the combination of shifting, scaling and cropping in the context of coding and decoding frames of left and right eye image pairs can be considerable.

Figure 4:
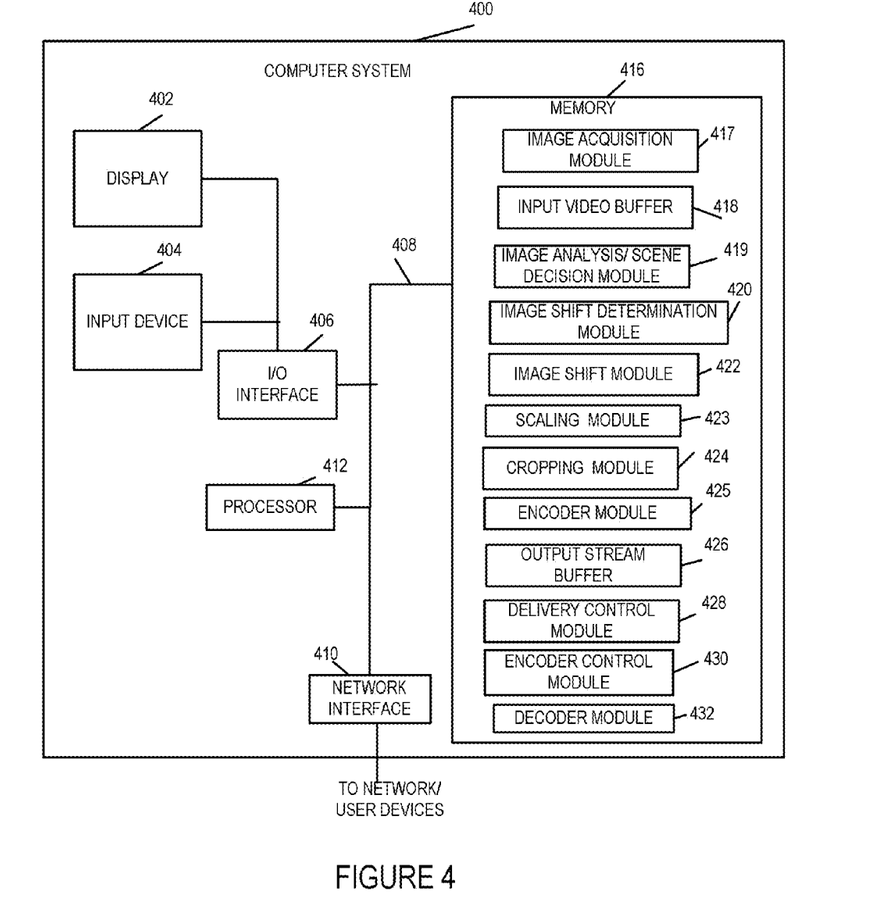
FIG. 4 illustrates a computer based encoding and decoding system implemented in accordance with the present invention.

The method and apparatus of the present invention can be implemented using a processor and memory as shown in FIG. 4.

FIG. 4 illustrates a computer based encoding and decoding system 400 implemented in accordance with the present invention. The system 400 includes a display 402, input device 404, input/output (I/O) interface 406, a processor 412, network interface 410 and a memory 416 which are coupled together by bus 408. The memory 416 includes various modules, e.g., routines, which when executed by the processor 412 control the computer system 400 to implement the encoding and/or decoding methods which have been described.

The memory 416 includes an image acquisition module 417 for receiving and storing video content to be encoded. The video content, e.g., left and right eye frame pairs of a stereoscopic e.g., 3D, image sequence, are stored in input buffer 418. Image analysis/decision module 419 analyses the buffered video content and makes decisions, e.g., frame to scene groupings, and provides information to the encoder and/or compression module 425. The analysis includes scene detection and grouping of frame pairs to scenes for purposes of subsequent image processing. For encoding purposes, the frames designated as corresponding to a scene are treated as a group of pictures with the first frame of the group being encoded using Intraframe coding.

The image shift determination module 420 determines the maximum shift required for the frames in a scene as well as the individual shifts to be applied to frames in frame pairs corresponding to a scene. Image shift module 422 is responsible for applying the determined shifts to individual frames, and scaling module 423 is responsible for implementing scaling operations. Cropping module 424 is used for performing cropping operations. Image shift, scaling and cropping modules are used for both encoding and decoding. Encoder module 425 encodes frames with left and right frames which have been subject to scaling, shifting and cropping being encoded with the left and right frames being presented in an interleaved manner to the encoder 425. Decoder module 432 decodes images which are then subject to shifting, scaling and cropping prior to output for display on the display 402. Delivery control module 428 supports streaming of content stored in output stream buffer 426. Content which is streamed may be produced by encoder module 425 as discussed above.

The encoder control module 430 is responsible for controlling the supply of content to be encoded from the input video buffer 420 to the encoder module 425 along with the corresponding encoder control information form image analysis/decision module 419.

The decoder module 432 can be used to decode an encoded stream and to supply it to the display 402. In this manner an operator of computer system 400 can view the result of the encoding process. The operator may control one or more encoding parameters via input device 404 and/or select which of the encoded bitstreams is to be decoded and displayed via input device 404. The various components of the computer system 400 are coupled together via bus 408 which allows for data to be communicated between the components of the system 400.

Figure 5:
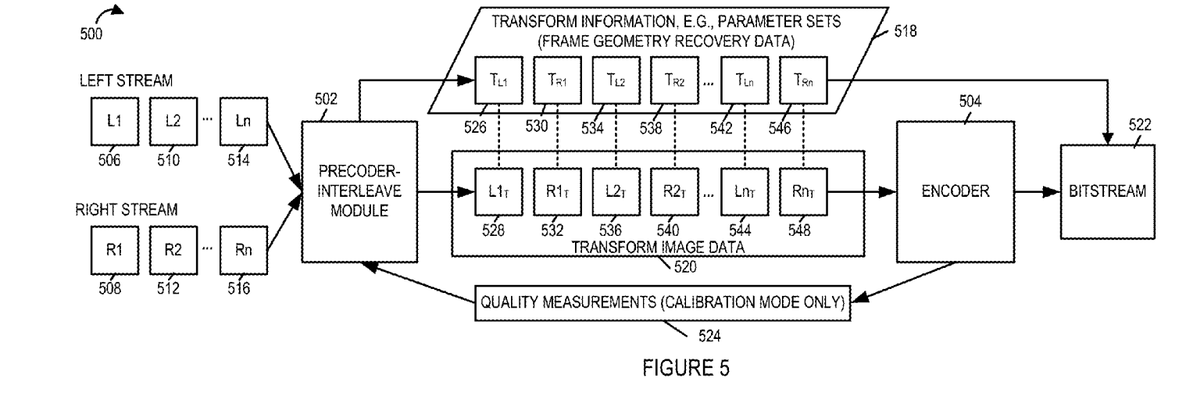
FIG. 5 is a drawing illustrating exemplary processing of input left/right image streams for a sequence of frames to generate a bitstream in accordance with an exemplary embodiment.

FIG. 5 is a drawing 500 illustrating exemplary processing of input left/right image streams for a sequence of frames to generate a bitstream in accordance with an exemplary embodiment. Drawing 500 includes a precoder-interleave module 502 for processing input image pairs, corresponding to input frames, and an encoder module 504 for encoding transformed image data. Precoder-interleave module 502 receives input images from a left stream and from a right stream in pairs, each pair corresponding to a frame, and generates transform information 518, e.g., parameter sets, and corresponding transform image data 520. The transform information is sometimes referred to as frame geometry recovery data. Precoder-interleave module 502 receives frame 1 left stream image L1 506 and frame 1 right stream image R1 508 as inputs and generates transform parameter set $T_{L1}$ 526, transform image data $L1_T$ 528, transform parameter set $T_{R1}$ 530 and transform image data $R1_T$ 532, as outputs. Precoder-interleave module 502 receives frame 2 left stream image L2 510 and frame 2 right stream image R2 512 as inputs and generates transform parameter set $T_{L2}$ 534, transform image data $L2_T$ 536, transform parameter set $T_{R2}$ 538 and transform image data $R2_T$ 540, as outputs. This process continues for each of the left/right image pairs of the frames being processed. Precoder-interleave module 502 receives frame n left stream image Ln 514 and frame n right stream image Rn 516 as inputs and generates transform parameter set $T_{Ln}$ 542, transform image data $Ln_T$ 544, transform parameter set $T_{Rn}$ 546 and transform image data $Rn_T$ 548, as outputs. The transform image data 520, which is interleaved left/right transformed image data, is input to the encoder 504, where it is encoded. Then, the encoded transformed image data is combined with the transform information 518 to generate a bitstream 522.

The precoder 502 also includes the capability to operate in a calibration mode. Based on specific configurations, e.g., lighting conditions, cameras, lenses, etc., transform methods for specific scenes are predetermined. The system is put into calibration mode and the precoder 502 goes through each of its transformation methods, and then the precoder 502 records quality data both internally and from the encoder. Quality measurements 524 indicates exemplary data from the encoder when in the calibration mode. Then the precoder 502 records the best transformation method into a preset for that particular scene setup and saves it, e.g., to disk. The quality data could be an encoding quality metric, QP, received back from the encoder, PSNR, SSIM, and/or any other quality metric. Then, when running in normal mode, the precoder 502, as part of or prior to the transform method discovery, would first try to match the scene meta data, as signaled through external means, with a preset. If it knows which preset, it would simply use that. If it does not recognize the scene data, then it would proceed trying to find the best transform method.

Figure 6:
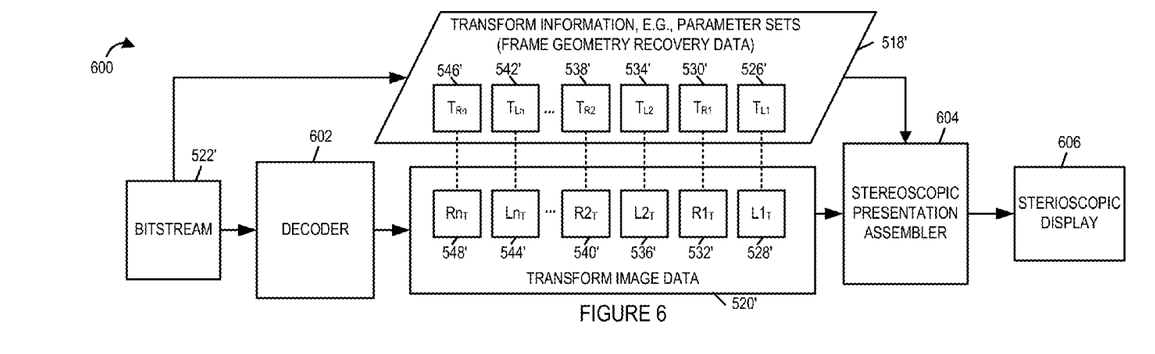
FIG. 6 is a drawing illustrating exemplary processing of a bit stream to generate stereoscopic display output in accordance with an exemplary embodiment.

FIG. 6 is a drawing 600 illustrating exemplary processing of a bit stream to generate stereoscopic display output in accordance with an exemplary embodiment. Drawing 600 includes a decoder 602, a stereoscopic presentation assembler 604 and a stereoscopic display 606. A portion of bitstream 522 is input to decoder 602 which recovers transform image data 520', and the recovered transform image data 520' is forwarded to the stereoscopic presentation assembler 604. A portion of the bitstream 522 includes transform information, e.g., parameter sets, sometimes referred to as frame geometry recovery data, which is also input to the stereoscopic presentation assembler. Stereoscopic presentation assembler 604 uses transform image data $L1_T$ 528' transform information parameter set $T_{L1}$ 526', transform image data $R1_T$ 532' and transform information parameter set $T_{R1}$ 530' to recover a stereo pair of images for frame 1, which is a representation of image pair (L1 506, R1 508). Stereoscopic presentation assembler 604 uses transform image data $L2_T$ 536' transform information parameter set $T_{L2}$ 534', transform image data $R2_T$ 540' and transform information parameter set $T_{R2}$ 538' to recover a stereo pair of images for frame 2, which is a representation of image pair (L2 510, R2 512). Stereoscopic presentation assembler 604 performs a similar operation to recover a stereo pair for each frame communicated in the bitstream 522'. Stereoscopic presentation assembler 604 uses transform image data $Ln_T$ 544' transform information parameter set $T_{Ln}$ 542', transform image data $Rn_T$ 548' and transform information parameter set $T_{Rn}$ 546' to recover a stereo pair of images for frame n, which is a representation of image pair (Ln 514, Rn 516).

Note that the input bitstream of FIG. 6 is represented as 522', while the output bitstream of FIG. 5 is represented as 522. In an example, where there is no corruption of the bitstream over the channel, the input bitstream of FIG. 6 is 522. Transform image data and transform information in FIG. 6 is similarly represented with reference numbering using 'in comparison to the reference numbering used for the transform image data and transform information generated in FIG. 5 to indicate that the information in FIG. 6 may include some corruption.

The output of the stereoscopic presentation assembler 604 is input to the stereoscopic display 606 which displays the images.

Figure 7:
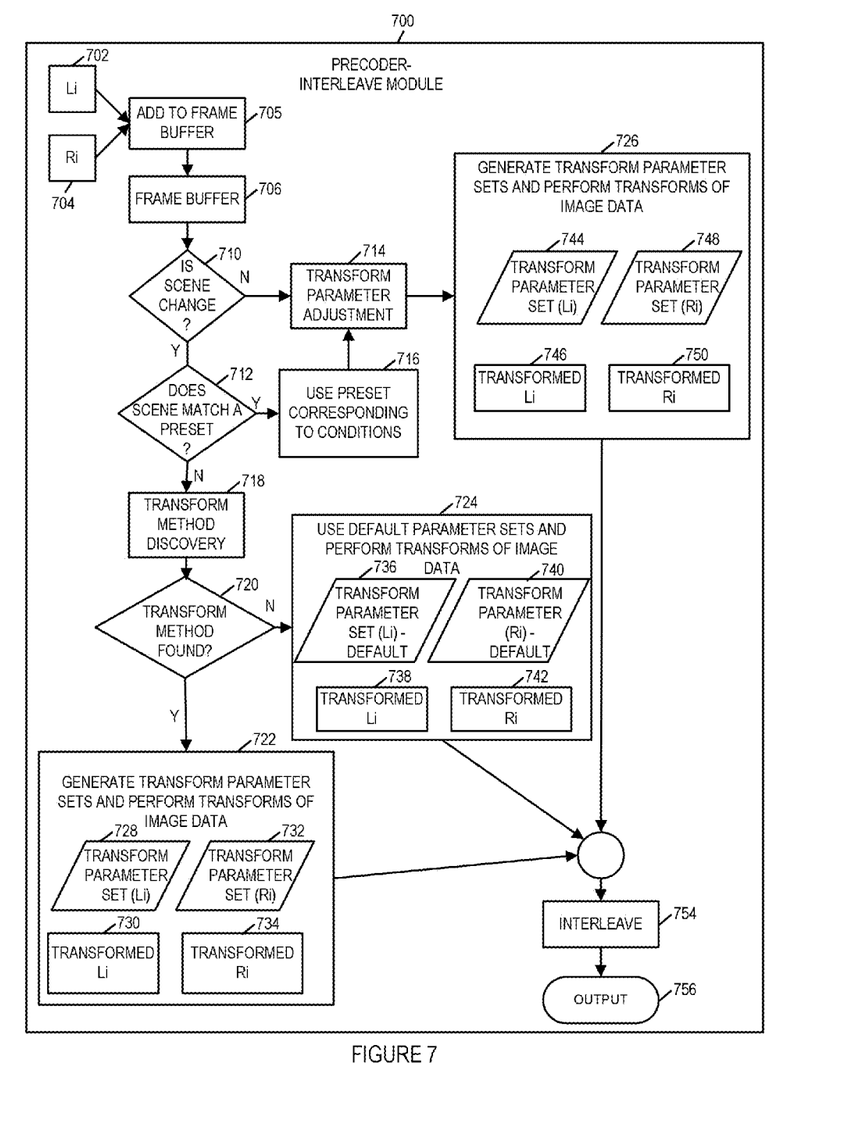
FIG. 7 illustrates an exemplary precoder-interleave module in accordance with an exemplary embodiment.

FIG. 7 illustrates an exemplary precoder-interleave module 700 in accordance with an exemplary embodiment. Exemplary precoder-interleave module 700 is, e.g., pre-code interleave module 502 of FIG. 5. Left stream image data corresponding to exemplary frame i, Li 702, and right stream image data corresponding to frame i, Ri 704 is added to frame buffer 706 by module 705. Exemplary frame i is, e.g., any one of the n frames of FIG. 5. Then, module 710 checks if there is a scene change or if this is the first frame being processed. If module 710 determines that there is a scene change or if this is the first frame being processed, then module 712 determines if the scene matches a preset. However, if module 710 determines that there is not a scene change, then module 714 performs a transform parameter adjustment.

If module 712 determines that the scene does not match a preset, then module 718 performs transform method discovery. Module 720 controls operation as a function of whether or not the transform method discovery module 718 has found a transform method. If the transform method discovery has found a transform method to use, then module 722 uses the found transform method to generate transform parameter sets and perform transforms of the image data (Li, Ri) to generate: transform parameter set for Li 728, transform parameter set for Ri 732, transformed image data Li 730, and transformed image data Ri 734.

If the transform method discovery has not found a transform method to use, then module 724 uses default parameter sets (default parameter set for Li 736, default parameter set for Ri 740) to perform transforms of the image data (Li, Ri) to generate transformed image data Li 738, and transformed image data Ri 742. In some embodiments, transformed image data Li 738 is a cropped representation of image data Li 702 and does not include any scaling transform or shift transform. In some embodiments, transformed image data Ri 742 is a cropped representation of image data Ri 704 and does not include any scaling transform or shift transform.

Returning to module 712, if module 712 determines that the scene does match a preset, e.g., one of a plurality of alternative presets determined during a calibration mode of operation, then module 716 uses the preset corresponding to the conditions. Next module 714 performs a transform parameter adjust from the preset. Then, module 726 uses the transform parameter adjustments to generate transform parameter sets and perform transforms of the image data (Li, Ri) to generate: transform parameter set for Li 744, transform parameter set for Ri 748, transformed image data Li 746, and transformed image data Ri 750. The transformed parameter sets and corresponding transformed image data, (728, 732, 730, 734) or (736, 740, 738, 742) or (744, 748, 746, 750) is forwarded to the interleave module 754 which performs interleaving of left and right information and outputs the information. In various embodiments, the transform parameters sets are interleaved in a first output stream and the transform image data is interleaved in a second output stream. In some embodiments, the interleaved transform image data is sent, in output step 756, to an encoder while the interleaved transform parameter sets bypasses the encoder.

In one exemplary embodiment, transform method discovery module 720 is implemented in accordance with the pseudo-code shown below.

Transform Method Discovery
function transform method discovery
   input left frame, right frame
{
   for each frame in stereo pair
     discover features
   for each left frame feature
     find matching right frame feature
     if match found
       add to feature map
   for each mapped feature
     calculate and store positional and size differences
   if positional differences near 0 and size differences near zero
     return default transform set
   if size differences are uniform
     determine scale factor based on size differences
     apply half of the scale factor to left and half to right frame
     add scaling factor to transform set
     recalculate features based on new scaling
   if positional differences are uniform
     determine shift amount
     apply half of shift to left frame and half to right frame to transform set
     recalculate features based on shift
   if size differences are not uniform and positional differences are not uniform
     perform exhaustive geometric modification
     if modification found
       apply geometric modification
       add advanced geometric modification to transform set
   return transform set and modified frame for left and right frames
}

In one exemplary embodiment, transform parameter adjustment module 714 is implemented in accordance with the pseudo-code shown below.

Transform Parameter Adjustment
function transform parameter adjustment
   input left frame, right frame, previous left transform, previous right transform
{
   for each input frame
     discover features
   for each input frame
     determine adjustment based on given previous transform
     apply adjustment
     set transform for frame
   return transform set
}

Figure 8:
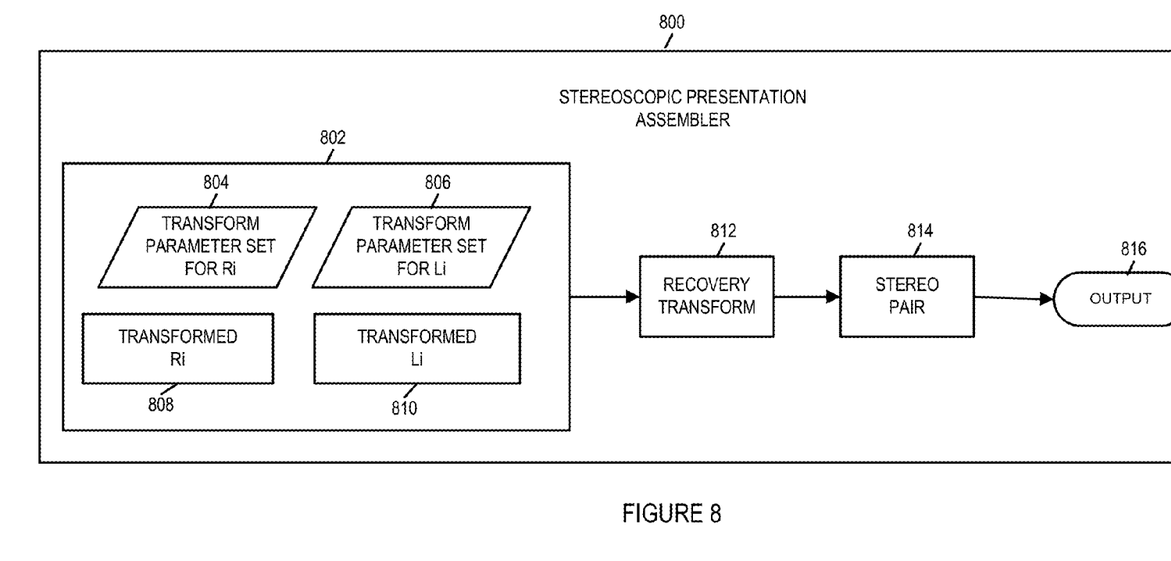
FIG. 8 is a drawing of an exemplary stereoscopic presentation assembler in accordance with an exemplary embodiment.

FIG. 8 is a drawing of an exemplary stereoscopic presentation assembler 800 in accordance with an exemplary embodiment. Exemplary stereoscopic presentation assembler 800 is, e.g., stereoscopic presentation assembler 604 of FIG. 6. Assembler 800 receives information 802 for each frame which is input to recovery transform module 812. Information 802 includes transform information for exemplary frame i (transform parameter set for Ri 804, transform parameter set for Li 806) and transformed image data for exemplary frame i (transformed Ri 808, transformed Li 810). The recovery transform module 812 generates stereo image pair 814. Output module 816 outputs the generated stereo pair 814, e.g., to a stereoscopic display.

In one exemplary embodiment, recovery transform module 812 is implemented in accordance with the pseudo-code shown below.

Recovery Transform
function recovery transform
   input left frame, right frame, left transform set, right transform set
{
   for each input frame
     for each transform
       perform inverse transformation replacing missing portions of the frame as needed
   return modified left frame and modified right frame
}

Figure 9:
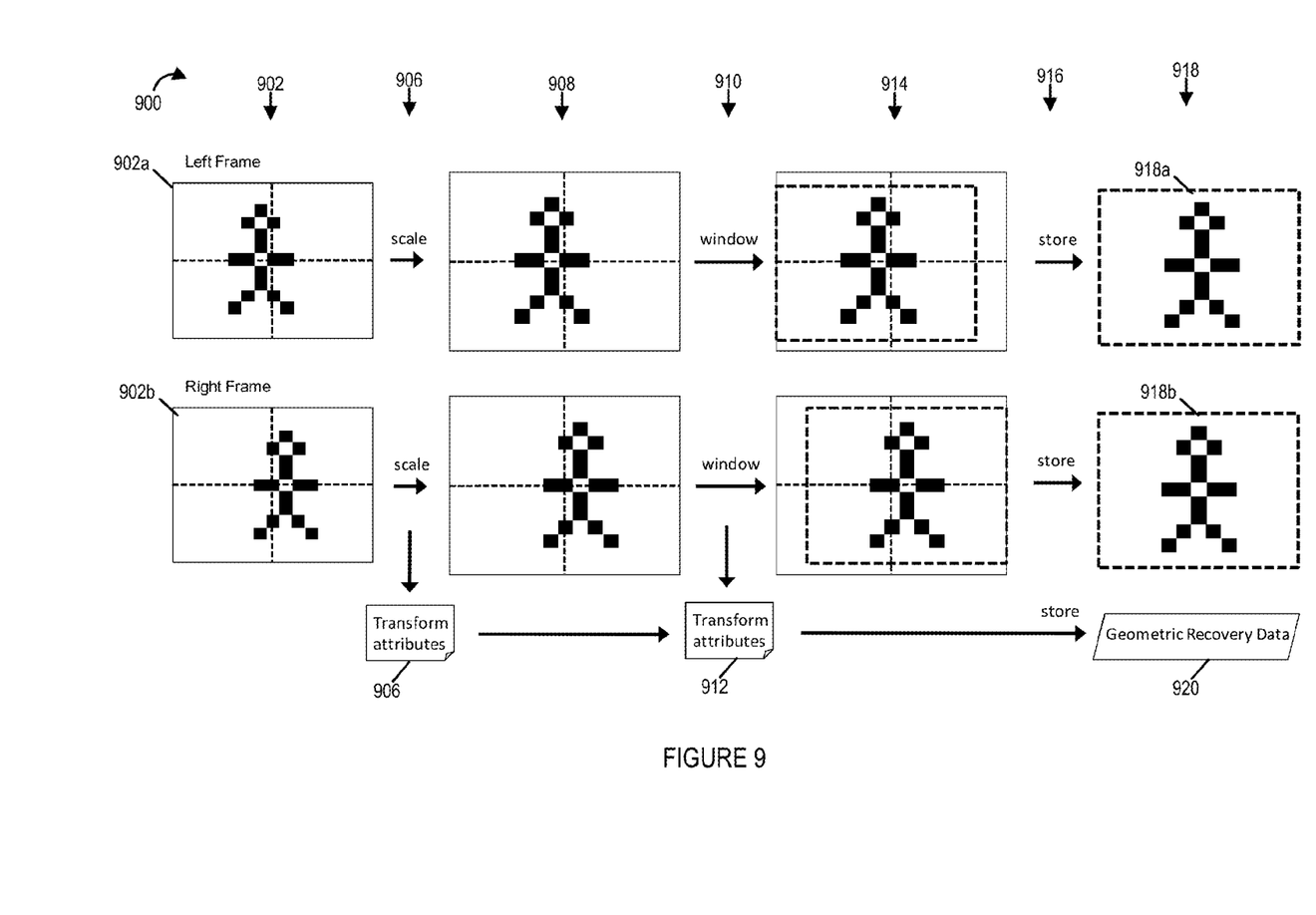
FIG. 9 illustrates exemplary operations for processing a left and right input image pair corresponding to a frame to generate transform information and corresponding transformed images in accordance with an exemplary embodiment.

Drawing 900 of FIG. 9 illustrates exemplary operations for processing a left and right input image pair corresponding to a frame to generate transform information and corresponding transformed images in accordance with an exemplary embodiment. Column 902 illustrates an exemplary left input image 902a and an exemplary right input image 902b of an exemplary input image pair for a frame. Column 906 illustrates that scaling operations are performed and transform attributes corresponding to the scaling are stored as information 906. Column 908 illustrates the output of the scaling. Column 910 indicates that windowing is performed on the scaled images and transform attributes corresponding to the windowing are stored as information 912. Column 914 illustrates the results of the windowing operation. Column 916 indicates that the scaled windowed images and the transform attributes are stored. Column 918 illustrates the transformed images (left transformed image 918a, right transformed image 918b) and corresponding geometric recovery data 920 which are stored.

Figure 10:
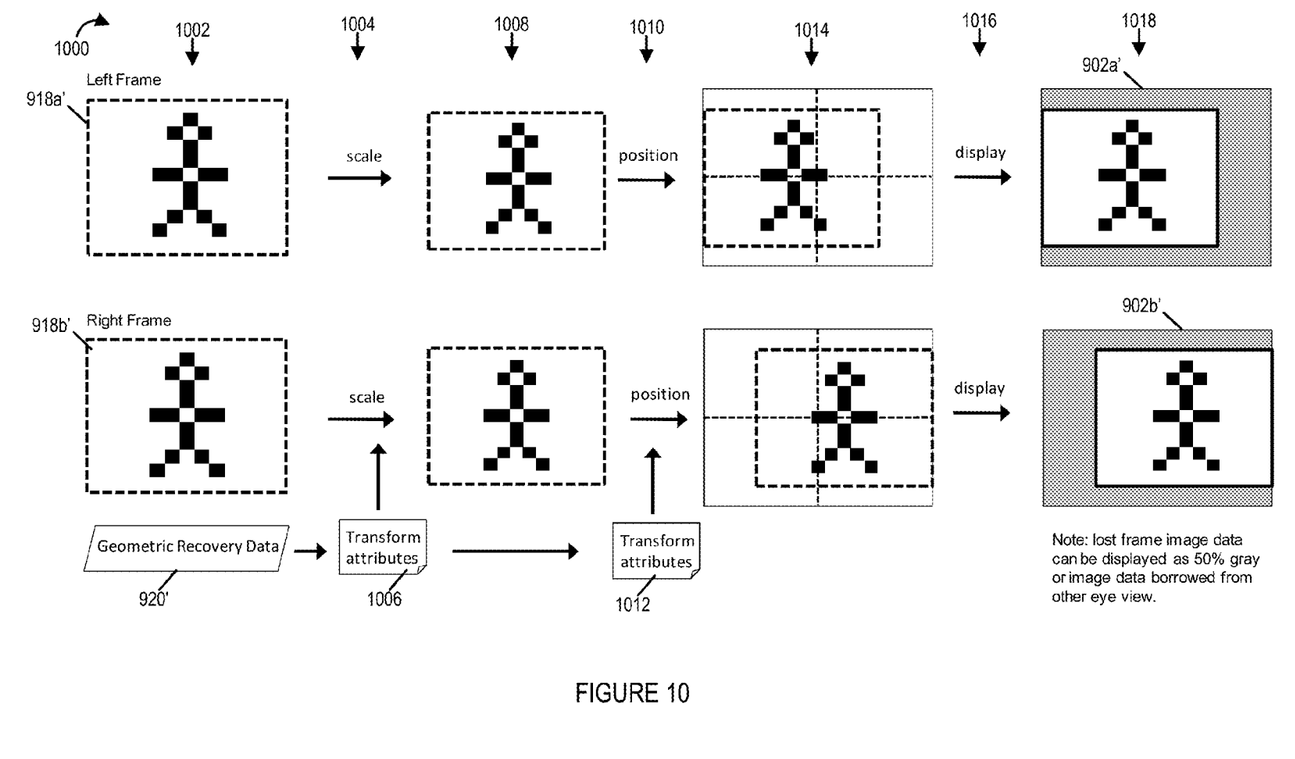
FIG. 10 illustrates exemplary operations for performing recovery transform operations in accordance with an exemplary embodiment.

Drawing 1000 of FIG. 10 illustrates exemplary operations for performing recovery transform operations in accordance with an exemplary embodiment. Column 1002 illustrates an exemplary left transform image 918a' and an exemplary right transform image 918b' corresponding to an input image pair for a frame, and corresponding geometric recovery data 920'. Column 1004 indicates that transform attributes 1006 regarding scaling are recovered from the geometric recovery data 920' and used to rescale the images (918a', 918b'). The results of the rescaling are shown in column 1008. Column 1010 indicates that transform attributes 1012 regarding positioning are recovered from the geometric recovery data 920' and used to position the rescaled images. The results of the positioning are shown in column 1014. Column 1016 indicates that the positioned rescaled images are displayed. Column 1018 illustrates exemplary display images (left display image 902a', right display image 902b'). In some embodiments, some or all of the lost frame image data is displayed as 50% gray. In some embodiments, some of all of the lost frame image data is borrowed from the other eye view.

In some embodiments the amount of image scaling is kept to 10% or less of the original image size. Image size may be expressed in terms of a number of horizontal and vertical pixels. In some embodiments scaling is kept to 5% or less of original image size. In at least some embodiments the scaling is kept to between 2% and 5% of the original unencrypted image size. Cropped images may, and in some embodiments are, kept to the size of the original input image or within 20 pixels in each of the vertical and horizontal directions of the original image size. In some embodiments the cropped picture is slightly small than the original image and does not include boarder pixels, e.g., an 8 pixel original image boarder, which are normally not displayed. In some such embodiments the cropped image size is kept the small likely displayed pixel size to minimize the loss of image data which is likely to be displayed and to use the limited bandwidth in an efficient manner. The amount of cropping, in at least some embodiments, is a function of the amount of image scaling which is applied since the size of the image which is communicated in encoded form is cropped to be the same or approximately the same size as the original image.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Some embodiments are directed to a processor configured to implement some or all of the steps of the methods described herein. Other embodiments are directed to machine, e.g., computer, readable medium including machine, e.g., computer, executable code for controlling a computer to implement the steps of the methods(s) described herein. In at least some embodiments the machine readable medium includes individual code corresponding to each recited step, the code including one or more computer executable instructions.

Numerous additional variations on the methods and apparatus of the various embodiments described above will be apparent to those skilled in the art in view of the above description. Such variations are to be considered within the scope.

What is claimed is:

1. A method of processing stereoscopic image data including a left eye image and a right eye image of a first frame pair, comprising:
   comparing content of said left eye image and said right eye image of the first frame pair to determine a first image shift which can be used to reduce a difference between the left eye image and right eye image;
   performing transform operations on said left eye image and said right eye image to reduce the difference between the left eye image and right eye image, said transform operations including scaling said left and right eye images by a first amount to generate scaled left and right eye images, cropping said scaled left eye image to generate a cropped scaled left eye image including scaled content shifted in a first direction relative to a center of the left eye image, and cropping said scaled right eye image to generate a cropped scaled right eye image including scaled content shifted in a second direction relative to a center of the right eye image;
   encoding said cropped scaled left eye image and cropped scaled right eye image to generate a first encoded frame pair, wherein encoding said cropped scaled left eye image and cropped scaled right eye image includes using an encoder which performs difference encoding on at least one of said cropped scaled left and right eye images using the other one of said cropped scaled left and right eye images as a reference image; and
   communicating information to a playback device, with said first encoded frame pair, indicating said first amount of scaling.

2. The method of claim 1, wherein said difference encoding includes motion compensated prediction encoding.

3. The method of claim 1, wherein said image shift which can be used to reduce the difference between the left eye image and right eye image is a maximum image shift in one of a vertical and horizontal direction required to minimize the difference between the left eye image and the right eye image.

4. The method of claim 1,
wherein the left eye image is of a first size; and
wherein cropping said scaled left eye image to generate a cropped scaled left eye image includes:
cropping said scaled left eye image to the first size, said cropped scaled left eye image being the same size as said left eye image.

5. The method of claim 1,
wherein said first and second directions are opposite directions; and
wherein said cropped scaled left eye image includes content which is shifted by an equal and opposite amount as compared to content of said cropped scaled right eye image.

6. The method of claim 1, further comprising:
generating a bitstream communicating said first encoded frame pair, scaling information corresponding to said first encoded frame pair, and shift information corresponding to said first encoded frame pair.

7. The method of claim 6, further comprising:
receiving a left eye image and a right eye image of a second frame pair, said second frame pair being a frame pair which follows said first frame pair in a sequence of frame pairs;
comparing content of said left eye image and said right eye image of the second frame pair to determine a second image shift which can be used to reduce a difference between the left eye image and right eye image of the second frame pair; and
performing transform operations on said left eye image and said right eye image of the second frame pair to reduce the difference between the left eye image and right eye image of the second frame pair, said transform operations including scaling said left and right eye images of the second frame pair by a second amount to generate scaled left and right eye images, said second amount being determined based on said first amount and said determined second image shift.

8. The method of claim 6, further comprising:
operating said playback device to:
decode said encoded first frame pair to produce decoded left and right eye images;
scale said decoded left and right eye images by an amount determined from scaling information communicated by the bitstream to generate a scaled decoded left eye image and a scaled decoded right eye image; and
crop said scaled decoded left eye image and scaled decoded right eye image.

9. The method of claim 8
wherein said cropping of said scaled decoded left and right eye images crops said scaled decoded left and right eye images to a size which is the size of said left eye image and right eye image of the first frame pair.

10. The method of claim 9,
wherein said scaling performed by said playback device on said decoded left and right eye images is by said first amount; and
wherein said cropping of said scaled decoded left and right eye images produces a cropped decoded left eye image including scaled content shifted relative to a center of the decoded left eye image in a direction opposite the first direction and a cropped decoded right eye image including scaled content shifted relative to a center of the decoded right eye image in a direction opposite the second direction.

11. A method of processing encoded stereoscopic image data including an encoded left eye image and an encoded right eye image of a frame pair, comprising:
decoding said encoded left and right eye images to produce decoded left and right eye images, said encoded left and right eye images having been encoded using difference encoding on at least one of a left eye image and a right eye image using the other one of the left and right eye images as a reference image, said left and right eye images having been produced by transform operations including scaling said left and right eye images to generate scaled left and right eye images, cropping said scaled left eye image to generate a cropped scaled left eye image including scaled content shifted in a first direction and cropping said scaled right eye image to generate a cropped scaled right eye image including scaled content shifted in a second direction, to reduce a difference between the left and right eye images, said second direction being opposite to said first direction;
scaling said decoded left and right eye images by a first amount indicated to a playback device by information supplied to said playback device along with said encoded left eye image and said encoded right eye image or prior to said encoded left and right eye images being supplied to said playback device;
cropping said scaled decoded left and right eye images, said cropping of said scaled decoded left and right eye images producing a cropped scaled decoded left eye image including scaled content shifted relative to the center of the decoded left eye image and a cropped scaled decoded right eye image including scaled content shifted relative to the center of the decoded right eye image; and
outputting said cropped scaled decoded left eye image and right eye image.

12. The method of claim 11, further comprising:
performing an inverse left eye transform operation on said scaled decoded left eye image prior to cropping said scaled decoded left eye image;
performing an inverse right eye transform operation on said scaled decoded right eye image prior to cropping said scaled decoded right eye image; and
wherein said cropping of said scaled decoded left and right eye images crops said decoded left and right eye images to the size of said encoded left and right eye images.

13. The method of claim 12,
wherein said inverse left eye transform operation includes a shift in a direction and amount which is based on left eye transform information supplied with said encoded left eye image;
wherein said inverse right eye transform operation includes a shift in a direction and amount which is based on right eye transform information supplied with said encoded right eye image.

14. The method of claim 13, wherein outputting said cropped scaled decoded left and right eye images includes providing the images to a display device for display to a user.

15. The method of claim 1, wherein said left and right eye transforms each include at least one of a null transform, shifting transform, anamorphic scaling transform, keystone transform or warping transform.

16. The method of claim 15, wherein said left eye transform is equal and opposite to said right eye transform when said left and right eye transforms are non-null transforms.

17. The method of claim 16
wherein said first amount of scaling is indicated by a global parameter used to control scaling of multiple frame pairs.

18. An apparatus including a processor configured to process stereoscopic image data including a left eye image and a right eye image of a first frame pair, said processor being configured to:
- compare content of said left eye image and said right eye image of the first frame pair to determine a first image shift which can be used to reduce a difference between the left eye image and right eye image;
- perform transform operations on said left eye image and said right eye image to reduce the difference between the left eye image and right eye image, said transform operations including scaling said left and eye right images by a first amount to generate scaled left and right eye images, cropping said scaled left eye image to generate a cropped scaled left eye image including scaled content shifted in a first direction relative to a center of the left eye image, and cropping said scaled right eye image to generate a cropped scaled right eye image including scaled content shifted in a second direction relative to a center of the right eye image;
- encode said cropped scaled left eye image and cropped scaled right eye image to generate a first encoded frame pair, wherein encoding said cropped scaled left eye image and cropped scaled right eye image includes using an encoder which performs difference encoding on at least one of said cropped scaled left and right eye images using the other one of said cropped scaled left and right eye images as a reference image; and
- communicate information to a playback device, with said first encoded frame pair, indicating said first amount of scaling.

* * * * *